Jan. 3, 1933.  H. H. FOGWELL  1,892,938

THERMOSTATIC SWITCH

Filed Nov. 23, 1931  2 Sheets-Sheet 1

INVENTOR:
Harrison H. Fogwell,
BY

ATTORNEY.

Jan. 3, 1933. H. H. FOGWELL 1,892,938
THERMOSTATIC SWITCH
Filed Nov. 23, 1931 2 Sheets-Sheet 2

INVENTOR:
Harrison H. Fogwell,
BY
ATTORNEY.

Patented Jan. 3, 1933

1,892,938

UNITED STATES PATENT OFFICE

HARRISON H. FOGWELL, OF LOS ANGELES, CALIFORNIA, ASSIGNOR TO EVERHOT ELECTRIC & MFG. CO., OF LOS ANGELES, CALIFORNIA, A CORPORATION OF CALIFORNIA

THERMOSTATIC SWITCH

Application filed November 23, 1931. Serial No. 576,677.

My invention relates to thermostatically controlled electric switches and relates particularly to a thermostatic switch especially adapted for controlling the flow of electric current to the heating elements of electric heating devices.

Although my invention is not limited to use as a control for electric heaters, I find that due to its simplicity and ruggedness it is especially adapted for this use, and I shall hereinafter, for the purpose of disclosing my invention in a simple manner, show and describe an embodiment thereof designed to control the flow of electric current to an electric heater connected to a hot water reservoir or tank and being adapted to heat the water contained in such tank.

It is an object of my invention to provide a thermostatic switch of rugged construction and adapted to break a circuit through which a relatively heavy electric current is flowing, a feature of this thermostatic switch being the simple and effective manner in which a quick make and break of the contacts is accomplished, thereby decreasing to a minimum the arcing of contacts and making it possible to control a relatively heavy flow of current.

It is an object of the invention to provide a thermostatic switch having a pair of contacts which are connected to thermostat means so as to be moved in unison and in contact by the thermostat means through a predetermined distance or to a predetermined point and then abruptly separated by the action of a throw-over means which causes one of the contacts to move independently of the other contact, thereby breaking the circuit controlled by the contacts with a minimum of arcing. In the preferred form of my invention the contacts are moved in one direction by the thermostat means in response to the thermostat means being heated, and the throw-over device then operates to separate or open the contacts, shutting off the supply of current to the electric heater with the result that the water in the tank starts to cool, and, as the water cools, the thermostat means exerts forces tending to move the contacts in a direction reverse to the movement of the contacts during the time the temperature of the thermostat means is being raised. At a certain point in the reverse movement of the parts of the thermostat means and the contacts, the throw-over again operates to move the contacts into re-engagement, thereby closing the circuit connected with the electric heater.

A further object of the invention is to provide a simple form of quick-acting throw-over for moving one of the contacts independently of the other, and a simple means for adjusting the throw-over to a desired position of operation whereby to vary the points at which the contacts will open and close.

A further object of the invention is to provide a simple form of switch of the above character having a latch which may be selectively utilized to hold the contacts in open or separated position when they have been moved into such position by the thermostat means. This latch is also provided with a means for holding it in inoperative position so that the operation of the thermostatic switch to open and close an electric circuit will be fully automatic and wholly responsive to variations in temperature of a heated area.

Further objects and advantages of the invention will be made evident throughout the following part of the specification.

Referring to the drawings which are for illustrative purposes only,

Figure 1:
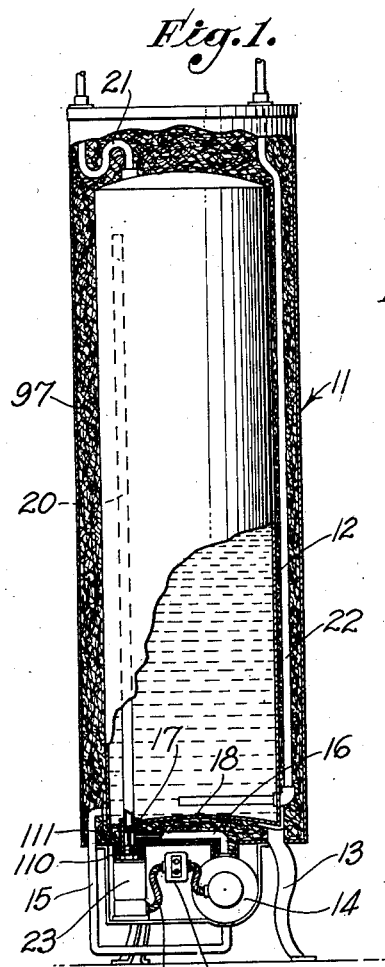
Fig. 1 is a partly sectioned elevational view showing a preferred embodiment of my invention in conjunction with an electric, storage-type water heater.

In Fig. 1 I show an electric water heater 11 including a storage tank 12 supported on legs 13 and having an electric heater 14 thereunder through which water from the tank 12 is circulated. From the lower portion of the tank 12 a cold water pipe 15 is extended to the heater 14, and from the upper portion of the heater 14 a hot water pipe 16 is extended to a T 17 which is connected into the bottom 18 of the tank and has a hot water inlet pipe 20 extending upwardly therefrom inside of the tank 12 so as to deliver water which has been heated by the heater 14 into the upper portion of the tank 12. Hot water is taken from the tank 12 through a pipe 21, and to replace the hot water which is drawn off cold water enters the bottom of the tank through piping 22. It is to be understood that this arrangement of piping is not essential to the use of my thermostatic switch but merely shows one form of apparatus with which the thermostatic switch is satisfactorily employed.

Figure 2:
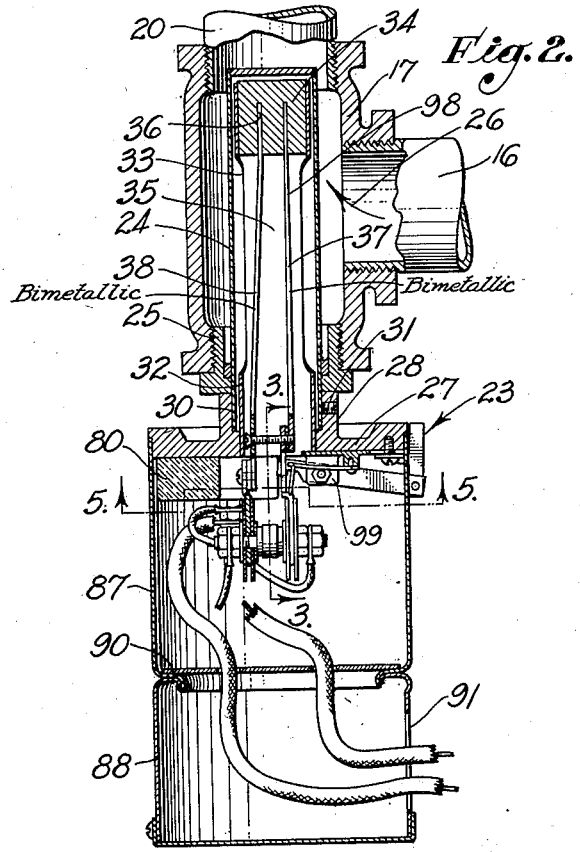
Fig. 2 is an enlarged, vertically sectioned view showing the manner in which my thermostatic switch may be placed in the hot water line of the heater so as to be operated by variations in temperature of the water passing therethrough.
Figure 3:
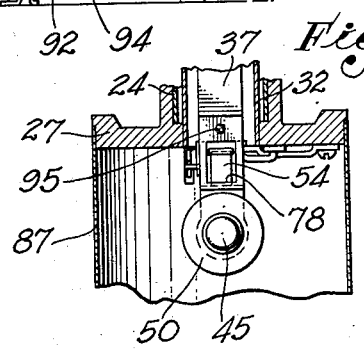
Fig. 3 is a fragmentary section on a plane represented by the line 3—3 of Fig. 2.
Figure 4:
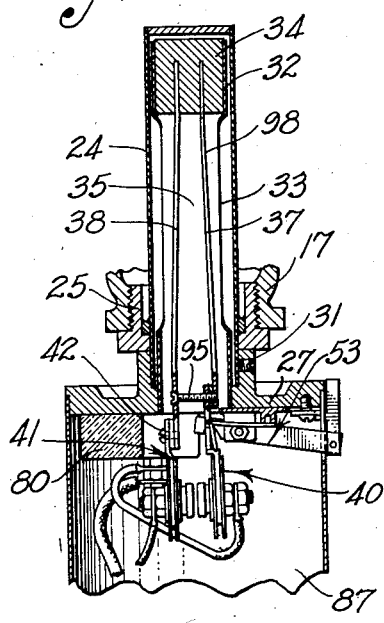
Fig. 4 is a fragmentary view similar to the upper portion of Fig. 2, showing the contacts of the thermostatic switch in open relationship.
Figure 6:
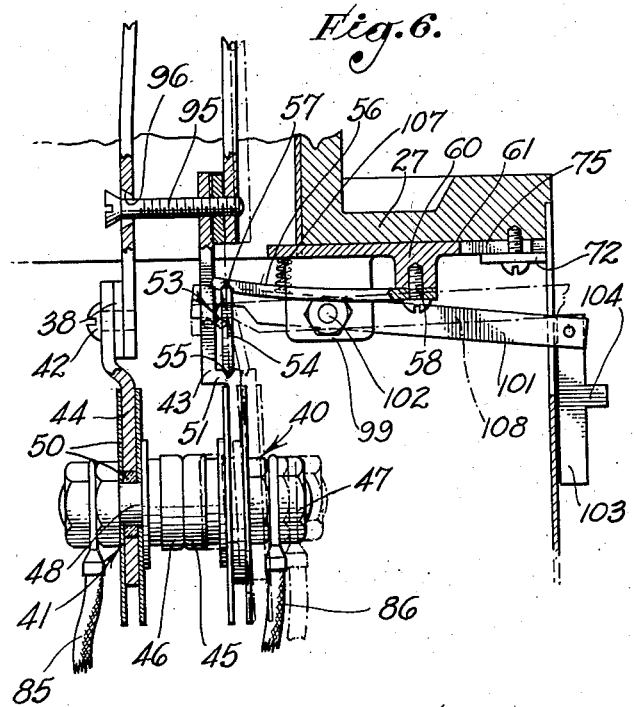
Fig. 6 is an enlarged, fragmentary, partly sectioned elevational view showing the contacts and the throw-over device to enlarged scale.

As shown in Figs. 1 and 2, my thermostatic switch 23 is situated below the T 17 which has a well or tube 24 of heat conductive metal projecting upwardly thereinto and being secured therein by use of a bushing 25 which is threaded into the lower end of the T. It will be perceived that the well 24 is in the path of the flow of hot water from the pipe 16 to the pipe 20, such flow being indicated by the arrow 26. The thermostatic switch includes a body 27 in the form of a flange having a concentric hub 28 with a recess 30 therein adapted to fit over the lower projecting end of the well 24, there being a set screw 31 for holding the body 27 in position on the lower end of the well 24. Mounted concentrically in the body 27 is a metal tube 32 having openings 33 therein and a metal block 34 in its upper end. The blocks 34 serves as a means for mounting a thermostat means 35 and has slots 36 therein for receiving the upper ends of a primary bimetallic thermostat element 37 and a secondary bimetallic thermostate element 38 which extend nearly parallel, as shown in Figs. 2 and 4. On the lower ends of the thermostat elements 37 and 38 are contact means 40 and 41. The contact means 41 is secured by a screw 42. The contact means 40 and 41 include metal plates 43 and 44, as shown in Fig. 6, and primary and secondary contacts 45 and 46 formed by securing bodies of silver on the heads of screws 47 and 48 which are insulated from the plates 43 and 44 by insulation washers 50. The plate 43 has an offset portion 51 therein extending horizontally or approximately tangential to the path through which the contact means 40 is swung by the thermostat element 37. Mounted on the lower face of the body 27 is a quick-acting throw-over means 53 including a swingable strut 54 consisting of a plate having its upper and lower edges thinned to substantially knife-edge form and having its lower end seated in a groove 55 which forms a pivot means movable with the contact means 40. Means for forcing the strut 54 yieldably downwardly is provided in the form of a spring 56 having a lateral groove 57 which engages the upper edge of the strut 54, and the inner end of which is secured by means of a screw 58 to a movable support 60 which is slidably mounted in a radial groove 61 formed in the lower face of the body 27.

Figure 5:
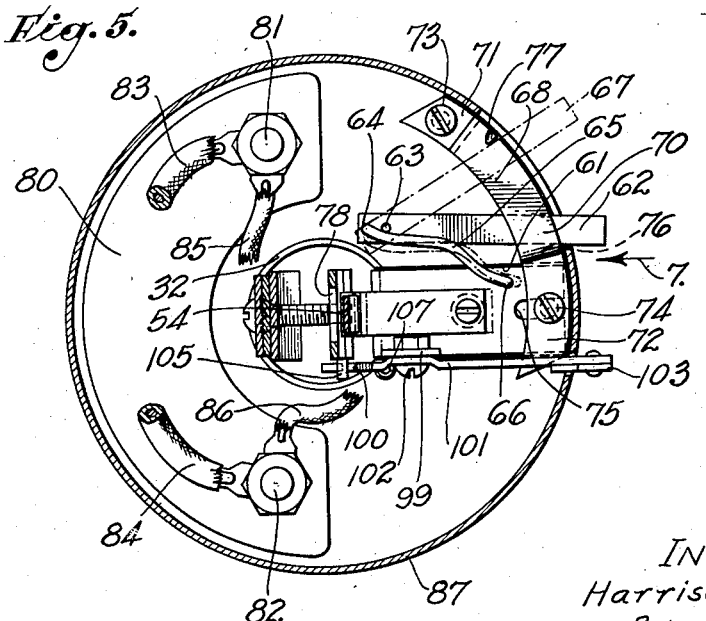
Fig. 5 is an enlarged cross section taken as indicated by the line 5—5 of Fig. 2.
Figure 7:
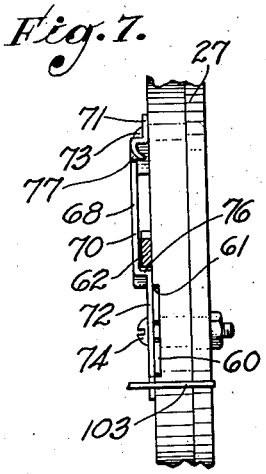
Fig. 7 is a fragmentary edge view derived as indicated by the arrow 7 of Fig. 5.

For the purpose of adjusting the position of the groove 57 whereby to vary the point at which the strut will swing or throw-over from one side to the other, a lever 62 is provided, this lever being pivoted on a pin 63 and having a hole 64 in its inner end for receiving one end of a link 65 which has its other end extending into a hole 66 in the movable support 60. By swinging the lever 62, as indicated in Fig. 5, between its full line position and its dotted line position 67, the support 60 may be caused to move inwardly or outwardly as desired. For limiting the swinging movement of the lever 62, I provide a strap 68 having a raised central portion 70 and ends 71 and 72. The upper end 71 is secured to the body 60 by means of a screw 73, and the lower end 72 extends over the radial slot 61 and the outer end of the support 60 and is secured by means of a screw 74 which extends through a radial slot 75 in the support 60. A shoulder 76 at one end of the raised portion 70 limits the movement of the lever 62 in one direction, and limitation of the movement of the lever in the other direction is accomplished by punching downwardly in proper position a tongue 77. A feature of simplicity in the construction of my device is the link 65 which may be bent as shown in Fig. 5 or straightened as desired to change the effective length of the link whereby to change the position of the support 60 relative to the lever 62 to initially adjust the throw-over device to operate within a range of temperatures corresponding to the swing of the lever 62. As clearly shown in Fig. 5, the plate 43 has an opening 78 therein through which the free end of the spring 56 may project and into which the strut 54 may project.

On the lower face of the body 27 opposite the throw-over device 53, an arcuate insulator 80 is secured, this insulator 80 carrying terminal screws 81 and 82 at the ends thereof to which electric wires 83 and 84 from the exterior may be secured, and from which screws flexible conductors 85 and 86 may be extended respectively to the screws 48 and 47 of the contact means 41 and 40. A casing 87 of cylindrical form, having a cylindrical junction box 88 rotatably secured at 90 to the lower end thereof so that the opening 91 may be swung in any desired direction to receive the end of a conduit 92, such as shown in Fig. 1, is secured in position depending from the body 27 and covering the switch mechanism which extends below the lower face of the body 27.

In Fig. 2 the contacts 45 and 46 are shown in closed position, and the thermostat elements 37 and 38 are shown in their leftward position assumed when the temperature to which they are subjected is below a critical value. It will be noted that the strut 54 is sloped in such direction that the downward force exerted by the spring 56 thereon will produce a lateral force tending to move the contact means 40 leftwardly, thereby assisting in holding the contacts 45 and 46 in tight engagement.

A feature of the thermostatic switch is that the bimetallic elements 37 and 38 are adapted to flex in unison; in other words, when the temperature to which they are subjected is increased, the lower ends thereof both move in rightward direction, thus swinging the strut toward and through the vertical position in which it is shown in Fig. 6. As the strut 54 is tilted rightwardly beyond vertical position, the lateral resultant force produced by the downward pressure of the spring 56 on the upper end of the strut 54 causes the contact means 40 to swing quickly in rightward direction independent of the movement of the contact means 41, thereby separating the silver contacts 45 and 46 and breaking the electric circuit which extends through the conduit 92 of Fig. 1 and includes the electric heating element of the heater 14. On the conduit 92 I show a hand-operated switch 94 whereby the heater may be turned on and off as desired. The extent to which the contact means 40 and 41 may be separated is determined by a screw 95 which projects from the upper end of the plate 43 and through an opening 96 in the thermostat element 38.

After the operation of the heater has been shut off by the opening of the contacts 45 and 46, the water in the tank may start to cool at a rate determined by the dissipation of heat through the insulation 97 surrounding the tank 12, or the water in the lower portion of the tank may be suddenly cooled by the entrance of cold water from the exterior when hot water is withdrawn through the hot water pipe 21. Cooling of the thermostat elements 37 and 38 results in their flexing in leftward direction so that the contact means 40 and 41 are swung leftwardly from the positions in which they are shown in Fig. 4. When the strut 54 is swung from the sloping position in which it is shown in Fig. 4 to a point slightly beyond vertical position, it will operate to abruptly move the contact means 40 in leftward direction independently of the movement of the contact means 41, thereby re-engaging the silver contacts 45 and 46 and closing the circuit of the heating element to the heater 14, thereby automatically controlling the operation of the electric heater associated with the storage tank 12. To assist in the quick movement of the contact means 40, the upper portion of the thermostat element 37 is reduced in thickness, as indicated at 98 in Figs. 2 and 4, to increase the flexibility of this member. It will be perceived that when the thermostat elements 37 and 38 are flexing rightwardly, the force of the element 38, transmitted through the contacts 46 and 45, assists the thermostat element 37 in swinging the strut 54 from diagonal position to a point slightly beyond vertical position. It is to be further noted that when the thermostat elements 37 and 38 are flexing in leftward direction, the force exerted by the element 38 is transmitted through the spacing means or screw 95 to the plate 43, thereby assisting in swinging the strut 54 through vertical position.

To make the operation of the thermostatic switch semi-automatic, I provide a latch 100 in the form of a hook at the inner end of a lever 101 which is fulcrumed on a screw 102 mounted in a bracket 99 which projects downwardly from the movable support 60. At the outer end of the lever 101 is a latch 103 which has a projecting lug 104 adapted to engage the lower edge of the body 27 and which is normally disposed in raised position, as shown in Fig. 2, during the automatic operation of the thermostatic switch. When the latch 103 is in raised position with the lug 104 thereof under the edge of the body 27, the lever 101 is held in such position that the hook or catch 100 is raised from a pin 105 which projects from the plate 43. By swinging the latch 103 into lowered position, as shown in Fig. 6, the lever 101 may be released so that it may be swung by a spring 107 toward the horizontal position indicated by dotted lines 108 in Fig. 6. Accordingly, when the contact means 40 is swung by the throw-over device 53 into open position relative to the contact means 41, the hook or latch 100 will drop over the pin 105 and prevent closing movement of the contact means 40 until the outer end of the lever is depressed so as to remove the hook or catch 100 from engagement with the pin 105. Being pivotally secured to the movable support 60, the lever 101 accordingly moves therewith so that the catch 100 is always in proper position to engage the pin 105.

A utility of this semi-automatic feature is that a person desiring hot water periodically and not continuously may start the heater by depressing the outer end of the lever 101, which will result in closing of the contacts 45 and 46, and after the water in the tank has become heated to the desired temperature, the contacts will automatically open, and the catch 100 will then operate to maintain them in open relationship until released manually.

Although in the preferred practice of my invention I employ two thermostat elements 37 and 38 operating in conjunction, the member 37 may be replaced by a simple metal strip which will permit the contact means 40 to be swung back and forth, the leftward and rightward forces required for such swinging action being provided by the thermostat element 38 and the quick-acting throw-over means 53.

Figure 8:
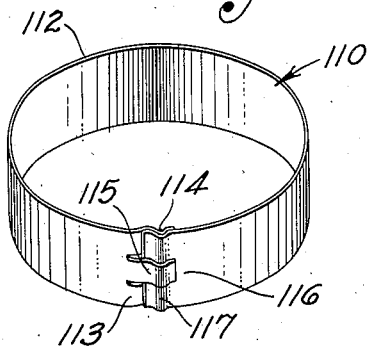
Fig. 8 is a perspective view of the simple insulation-retaining ring employed in the invention.

As shown in Figs. 1 and 8, I provide a detachable metal ring 110 for holding a body of insulation 111 around the lower projecting portion of the T 17, this ring consisting of a metal strap 112, as shown in Fig. 8, having one end 113 thereof crimped as indicated at 114 and provided with a tongue 115. The other end 116 of the strap 112 is correspondingly crimped as shown at 117 so that when it is forced in under the tongue 115, the crimped portion 117 thereof will engage the crimped portion 114 and be thereby retained in engagement.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A thermostatic switch of the character described including: a primary contact; a secondary contact; thermostatic means connected to said contacts so as to move them in unison, said thermostatic means comprising a pair of bimetallic thermostats having their inner ends connected to said contacts and their outer ends secured in stationary relationship, said bimetallic thermostats flexing in unison in response to temperature changes; pivot means connected to said primary contact so as to move therewith; a swingable strut having one end connected to said pivot means; yieldable means engaging the other end of said swingable strut and exerting a force toward said pivot means to cause said strut to tilt from one side to another relative to said yieldable means and to thereby exert a force to move said primary contact independently of said secondary contact when said contacts have been moved into predetermined positions by said bimetallic thermostats; a support for said yieldable means, said support being movable in a direction substantially parallel to the movement of said pivot means for the purpose of adjusting the point of swing-over of said strut; a lever swingably mounted; an adjustable link connecting said lever with said support whereby to move said support; a latch mounted on said support for engaging and holding said primary contact in open position relative to said secondary contact when said primary contact has been moved into relatively open position by said strut; and a member connected to said latch, such member being selectively operable to hold said latch in inoperative position to make the operation of the thermostatic switch fully automatic during such time.

2. A thermostatic switch of the character described, including: a primary contact; a secondary contact; thermostatic means connected to said contacts so as to move them in unison, said thermostatic means comprising a pair of bimetallic thermostats having their inner ends connected to said contacts and their outer ends secured in stationary relationship, said bimetallic thermostats flexing in unison in response to temperature changes; pivot means connected to said primary contact so as to move therewith; a swingable strut having one end connected to said pivot means; yieldable means engaging the other end of said swingable strut and exerting a force toward said pivot means to cause said strut to tilt from one side to another relative to said yieldable means and to thereby exert a force to move said primary contact independently of said secondary contact when said contacts have been moved into predetermined positions by said bimetallic thermostats; a support for said yieldable means, said support being movable in a direction substantially parallel to the movement of said pivot means for the purpose of adjusting the point of swing-over of said strut; a lever swingably mounted; an adjustable link connecting said lever with said support whereby to move said support; and a latch mounted on said support for engaging and holding said primary contact in open position relative to said secondary contact when said primary contact has been moved into relatively open position by said strut.

3. A thermostatic switch of the character described, including: a primary contact; a secondary contact; thermostatic means connected to said contacts so as to move them in unison, said thermostatic means comprising a pair of bimetallic thermostats having their inner ends connected to said contacts and their outer ends secured in stationary relationship, said bimetallic thermostats flexing in unison in response to temperature changes; pivot means connected to said primary contact so as to move therewith; a swingable strut having one end connected to said pivot means; yieldable means engaging the other end of said swingable strut and exerting a force toward said pivot means to cause said strut to tilt from one side to another relative to said yieldable means and to thereby exert a force to move said primary contact independently of said secondary contact when said contacts have been moved into predetermined positions by said bimetallic thermostats; a support for said yieldable means, said support being movable in a direction substantially parallel to the movement of said pivot means for the purpose of adjusting the point of swing-over of said strut; a lever swingably mounted; and an adjustable link connecting said lever with said support whereby to move said support.

4. A thermostatic switch of the character described, including: a primary contact; a secondary contact; thermostatic means connected to said contacts so as to move them in unison, said thermostatic means comprising a pair of bimetallic thermostats having their inner ends connected to said contacts and their outer ends secured in stationary relationship, said bimetallic thermostats flexing in unison in response to temperature changes; pivot means connected to said primary contact so as to move therewith; a swingable strut having one end connected to said pivot means; and yieldable means engaging the other end of said swingable strut and exerting a force toward said pivot means to cause said strut to tilt from one side to another relative to said yieldable means and to thereby exert a force to move said primary contact independently of said secondary contact when said contacts have been moved into predetermined positions by said bimetallic thermostats.

5. A thermostatic switch of the character described, including: a primary contact; a secondary contact; thermostatic means connected to said contacts so as to move them in unison, said thermostatic means comprising a pair of bimetallic thermostats having their inner ends connected to said contacts and their outer ends secured in stationary relationship, said bimetallic thermostats flexing in unison in response to temperature changes; and means operative to automatically move said primary contact independently of said secondary contact when said contacts have moved into predetermined positions in response to flexure of said bimetallic thermostats.

6. A thermostatic switch of the character described, including: a primary contact; a secondary contact; thermostat means connected to said contacts so as to move them in unison; means operative to automatically move said primary contact independently of said secondary contact in response to movement of said contacts into a predetermined position; and a catch for holding said primary contact in open position relative to said secondary contact, there being means with said catch selectively operable to hold said catch in inoperative position.

7. A thermostatic switch of the character described, including: a primary contact; a secondary contact; thermostat means connected to said contacts so as to move them in unison; pivot means moving with said primary contact; a swingable strut having one end connected to said pivot means; yieldable means engaging the other end of said strut and exerting a force toward said pivot means to cause said strut to tilt from one side to another and move said primary contact independently of said secondary contact; a support for said yieldable means slidably mounted to move substantially parallel to the path through which said pivot means moves in response to movement of said thermostat means; means for moving said support so as to vary the position of operation of said strut; and a catch for holding said primary contact in open position relative to said secondary contact, said catch being swingably mounted on said support and being moved therewith.

8. A thermostatic switch of the character described, including: a primary contact; a secondary contact; thermostat means connected to said contacts so as to move them in unison; pivot means moving with said primary contact; a swingable strut having one end connected to said pivot means; yieldable means engaging the other end of said strut and exerting a force toward said pivot means to cause said strut to tilt from one side to another and move said primary contact independently of said secondary contact; a support for said yieldable means slidably mounted to move substantially parallel to the path through which said pivot means moves in response to movement of said thermostat means; and means for moving said support so as to vary the position of operation of said strut.

9. A thermostatic switch of the character described, including: a primary contact; a secondary contact; thermostat means connected to said contacts so as to move them in unison; pivot means moving with said primary contact; a swingable strut having one end connected to said pivot means; yieldable means engaging the other end of said strut and exerting a force toward said pivot means to cause said strut to tilt from one side to another and move said primary contact independently of said secondary contact; and means for moving said yieldable means relative to the path through which said pivot means moves in response to movement of said thermostat means.

10. A thermostatic switch of the character described, including: a primary contact; a secondary contact; thermostat means connected to said contacts so as to move them in unison, pivot means moving with said primary contact; a swingable strut having one end connected to said pivot means; and yieldable means engaging the other end of said strut and exerting a force toward said pivot means to cause said strut to tilt from one side to another and move said primary contact independently of said secondary contact.

11. A thermostatic switch of the character described, including: a primary contact; a secondary contact; thermostat means comprising a pair of thermostats having parts moving in unison and connected to said contacts so as to move them in unison; means operative to automatically move said primary contact independently of said secondary contact in response to movement of said contacts into a predetermined position; and a catch for holding said primary contact in open position relative to said secondary contact.

12. A thermostatic switch of the character described, including: a primary contact; a secondary contact; thermostat means comprising a pair of thermostats having parts moving in unison and connected to said contacts so as to move them in unison; and means operative to automatically move said primary contact independently of said secondary contact in response to movement of said contacts into a predetermined position.

13. A thermostatic switch of the character described, including: a primary contact; a secondary contact; thermostat means connected to said contacts so as to move them in unison; means operative to automatically move said primary contact independently of said secondary contact in response to movement of said contacts into a predetermined position, said means being movable to vary its position of operation; and a catch for holding said primary contact in open position relative to said secondary contact, said catch being connected to said means so as to be moved in accordance with the changes in the position of operation of said means.

14. A thermostatic switch of the character described, including: a primary contact; a secondary contact; thermostat means connected to said contacts so as to move them in unison; means operative to automatically move said primary contact independently of said secondary contact in response to movement of said contacts into a predetermined position; and a catch for holding said primary contact in open position relative to said secondary contact.

15. A thermostatic switch of the character described, including: a primary contact; a secondary contact; thermostat means connected to said contacts so as to move them in unison; and a throw-over connected to said primary contact so as to automatically move said primary contact independently of said secondary contact in response to movement of said contacts into a predetermined position.

16. A thermostatic switch of the character described, including: a primary contact; a secondary contact; thermostat means connected to said contacts so as to move them in unison; and means operative to automatically move said primary contact independently of said secondary contact in response to movement of said contacts into a predetermined position.

In testimony whereof, I have hereunto set my hand at Los Angeles, California, this 17th day of November, 1931.

HARRISON H. FOGWELL.